(12) United States Patent
Chen et al.

(10) Patent No.: US 8,890,791 B2
(45) Date of Patent: Nov. 18, 2014

(54) DRIVE CIRCUIT OF LIQUID CRYSTAL PANEL

(71) Applicant: Shenzhen China Star Optoelectronics Technology Co., Ltd., Shenzhen, Guangdong (CN)

(72) Inventors: Yinhung Chen, Shenzhen (CN); Xia Tian, Shenzhen (CN); Pei Jia, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 208 days.

(21) Appl. No.: 13/805,662

(22) PCT Filed: Nov. 6, 2012

(86) PCT No.: PCT/CN2012/084108
§ 371 (c)(1),
(2), (4) Date: Dec. 20, 2012

(87) PCT Pub. No.: WO2014/063387
PCT Pub. Date: May 1, 2014

(65) Prior Publication Data
US 2014/0111718 A1    Apr. 24, 2014

(30) Foreign Application Priority Data
Oct. 22, 2012  (CN) .......................... 2012 1 0404871

(51) Int. Cl.
*G09G 3/36* (2006.01)
*G02F 1/133* (2006.01)

(52) U.S. Cl.
CPC ............ *G02F 1/13306* (2013.01); *G02F 1/133* (2013.01)

USPC .............................................. 345/100; 345/87

(58) Field of Classification Search
USPC ..................................................... 345/87, 100
See application file for complete search history.

(56) References Cited

U.S. PATENT DOCUMENTS

| | | | | |
|---|---|---|---|---|
| 2005/0007330 A1* | 1/2005 | Miyata et al. | .................... | 345/92 |
| 2006/0077163 A1* | 4/2006 | Yanagi et al. | .................... | 345/94 |

FOREIGN PATENT DOCUMENTS

| | | | |
|---|---|---|---|
| CN | 1319833 | A | 10/2001 |
| CN | 101300619 | A | 11/2008 |
| CN | 1667457 | A | 5/2009 |
| JP | 6-43833 | A | 2/1994 |
| JP | 6-110035 | A | 4/1994 |

* cited by examiner

*Primary Examiner* — Jonathan Boyd
(74) *Attorney, Agent, or Firm* — Andrew C. Cheng

(57) ABSTRACT

A drive circuit of liquid crystal panel includes a gate driver, a source driver, gate lines, and the data lines. The gate lines and the data lines define multiple pixel units each of which includes a thin-film transistor, a common electrode, a pixel electrode, and a storage capacitor. The thin-film transistor is electrically connected to the gate driver and the source driver via the gate line and the data line. The gate driver includes a drive combination circuit, which includes a first electrical switch, an amplifier, a first drive source, a second drive source, a first resistor, a third drive source, a second resistor, a third resistor, a second electrical switch and a fourth drive source. The drive circuit reduces the influence of a parasitic capacitor on the extension of conduction time of the thin-film transistor and improves the quality of a large-sized liquid crystal display device using the circuit.

9 Claims, 10 Drawing Sheets

DRIVE CIRCUIT OF LIQUID CRYSTAL PANEL

BACKGROUND OF THE INVENTION

1. Field of the Invention

The present invention relates to the field of liquid crystal display, and in particular to a drive circuit of liquid crystal panel of liquid crystal display device.

2. The Related Arts

The progress of science and technology and the improvement of living quality of human beings makes liquid crystal display devices widely used everywhere in daily living. People are now asking for more for the liquid crystal display devices and start demanding large display screen and fast response. However, increasing the size of the liquid crystal display brings more complicated wire lay-out. Also, accurately controlling pixel electrodes is getting more difficult due to wiring delay caused by the increase of number of pixel electrodes driven by a TFT (Thin-Film Transistor) substrate and feedback caused by the existence of TFT parasitic capacitor.

FIG. 1 is a schematic view showing the structure of a VA (Vertical Alignment) liquid crystal display device. In the drawing, liquid crystal molecules 100 maintain perpendicular to and are aligned between two substrates 300, 400 when no drive voltage is applied. When a drive voltage is applied, the liquid crystal molecules 100 located around pixel electrodes 200 are rotated by 0-90°.

FIG. 2 is a schematic view showing a basic drive circuit of a TFT array substrate. In the drawing, pixel electrodes 200 are shown distributed in the entire TFT array substrate and each pixel electrode 200 is at least connected to a drain terminal d of one TFT. The source terminal s of each TFT is at least connected to one data line and a plurality data lines collectively constitutes a data bus structure. The gate terminal g of each TFT is at least connected to one gate line and a plurality of gate lines collectively constitutes a gate bus structure. The data bus and the gate bus collectively control data writing of the pixel electrodes via the thin-film transistors. As shown in FIG. 2, the pixel electrode P(I,j) of the ith column and the jth row of the TFT array substrate is commonly controlled by the gate line G(j) and data line S(i). When a writing operation is performed on the pixel electrode P(i,j), the gate line G(j) is set at a high level to set the thin-film transistor T(i,j) in a conducting state. Under this condition, the magnitude of the drive voltage applied through the data line S(i) causes the liquid crystal molecules neighboring the pixel electrode P(I,j) to rotate according to a predetermined rotation direction so as to achieve displaying of image. Such a writing operation is performed in row-wise manner, so that when the gate line G(j) is in the high level, all the pixel electrodes of the jth row can perform a writing operation.

Referring to FIG. 3, which is a schematic view showing connection of an equivalent drive circuit of each pixel electrode, the ith data line S(i) is connected to the source terminal s of the thin-film transistor T(i,j) at the ith column and the jth row. The jth gate line G(j) is connected to the gate terminal g of the thin-film transistor T(i,j) at the ith column and the jth row. The drain terminal d of the thin-film transistor T(i,j) at the ith column and the jth row is connected to the pixel electrode P(i,j) at the ith column and the jth row. Capacitor $C_{gd}$ is a parasitic capacitor between the gate terminal g and the drain terminal d. The parasitic capacitor $C_{gd}$ is inherent to the TFT triode. The symbol $C_{lc}$ indicates an equivalent capacitor of a liquid crystal layer between the TFT substrate and a CF (Color Filter) substrate. The symbol $C_s$ is a compensation capacitor between the TFT substrate and Vcom and the capacitor is provided for compensation for voltage drop of $C_{lc}$ through electrical discharging in order to properly extend the retention time for direction change of liquid crystal molecules in the area of $C_{lc}$. However, with the increase of the numbers of rows and columns of the pixel electrodes that are arranged in a matrix form, the lengthened gate lines and data lines cause time delay in the drive circuit. As shown in FIG. 4, on the other hand, the parasitic capacitor $C_{gd}$ existing between the gate terminal g and the drain terminal d of the thin-film transistor directly affects the gate voltage $V_g$ controlling conduction and cutoff of the thin-film transistor, especially for the neighboring site of the pixel electrode P(n,j) that is located at a distal end away from the data bus circuit, where due to the influence of discharging voltage caused by the parasitic capacitors $C_{gd}$ of the previous (n−1) thin-film transistors that the gate signal passed first and the influence caused by circuit delay, this site may have an extended response time and also suffers attenuation of gate voltage caused by the electrical discharging when the gate voltage goes from high to low, making the conduction time of the thin-film transistor T(n,j) extended from $T_j$ by $\Delta T_j$. In other words, the thin-film transistor that is supposed to be cut off is abnormally conducted on. This makes the driving time of the pixel electrode P(n,j) connected to the drain terminal d of the thin-film transistor extended by $\Delta T_{dx}$, leading to abnormal rotation of the liquid crystal molecules neighboring the pixel electrode, which causes variation of transmittance and abnormality of contrast.

U.S. Pat. No. 7,304,626 suggests the following in respect of the abnormality of displaying resulting from TFT gate voltage delay caused by parasitic capacitance:

(1) Using variation of resistance of a resistance-variable component or a voltage-controlling resistance-variable component to compensate the influence of discharging voltage caused by parasitic capacitor when the voltage of gate line is getting lower.

As shown in FIG. 5, in a gate signal generation circuit, SC is resistance-variable component or voltage-controlling resistance-variable component. A drive voltage is such that a high level VD1 generated by a high level generation circuit $VD1_X$ and a low level VD2 generated by a low level generation circuit $VD2_X$ form a drive voltage for a gate line through the conduction and closing of a controlled switch 3b. When 3b is in conduction with the high level VD1, charging is made to the parasitic capacitor $C_{gd}$ and $C_{lc}$ to drive the pixel electrode; and when 3b is in conduction with the low level VD2, the variation of resistance of the SC component is applied to vary voltage drop of the resistor to compensate the discharging voltage of the parasitic capacitor, thereby reducing the delay of the gate line voltage and improving image displaying quality.

(2) Using a VD1a signal generation circuit structure of FIG. 6A to form a VD1 high level generation circuit on the basis of FIG. 5 and also omitting the resistance-variable component or voltage-controlling resistance-variable component SC that compensates the influence of discharging voltage of the parasitic capacitor when voltage of the gate line gets lowering.

The signal VD1a generated by the circuit structure shown in FIG. 6A is shown in FIG. 6B in a high level. At the end of each period of the high level, a waveform of the falling edge is formed in a predetermined dropping rate. At the end of a period of the signal VD1a, the switch 3b is surely set in connection with the low level VD2 generation circuit. A period of the high level VD1a and a low level period of VD2 collectively form a period of the gate signal VG of the gate line.

Symbol Stc is voltage having a waveform similar to GCK and can be a basic voltage obtained through GCK/GSP conversion and generally uses an inverting amplifier to control conduction and cutoff of SW2 switch.

When Stc is high level, SW1 is conducting and SW2 is low level, where SW2 is cut off and the voltage passes is Vdd and at the same time Vdd charges Ccnt capacitor so that after becoming steady, the voltage of VD1$a$ is Vdd. When Stc is low level, SW1 is cut off and SW2 is high level, where SW2 is conducting and the voltage of VDa is obtained as a division voltage through Rcnt on the basis of Stc. The already-charged Ccnt is now discharging, providing VD1$a$ a constant dropping rate, of which the waveform is specifically shown in FIG. 6B, thereby obtaining a drive voltage that is applied from the gate line to the gate terminal of the thin-film transistor to be of a waveform illustrated as VG(j).

(3) Using a VD1$b$ signal generation circuit structure of FIG. 7A to form a VD1 high level generation circuit on the basis of FIG. 5 and also omitting the resistance-variable component or voltage-controlling resistance-variable component SC that compensates the influence of discharging voltage of the parasitic capacitor when voltage of the gate line gets lowering.

The signal VD1$b$ generated by the circuit structure shown in FIG. 7A is shown in FIG. 7B in a high level. At the end of each period of the high level, a waveform of the falling edge is formed in a predetermined dropping rate. At the end of a period of the signal VD1$a$, the switch 3$b$ is surely set in connection with the low level VD2 generation circuit. Similarly, a period of the high level VD1$a$ and a low level period of VD2 collectively form a period of the gate signal VG of the gate line.

The block indicated by phantom lines in FIG. 7A is a DC charging/discharging oscillation circuit, while that outside the phantom line block is an operational amplifier, wherein Stc is still a voltage having a waveform similar to GCK and can be a basic voltage obtained through GCK/GSP conversion. Vct is a voltage at the negative terminal of the amplifier and Rct and Cct are charging/discharging unit. When Cct is saturated, the voltage thereof is exactly the voltage Vct of a direct current let flowing through Rct.

When Stc is high level, SW3 is open, where the output voltage VD1$b$ is a voltage that is of the same polarity as Vdd and is proportional to Vdd. The voltage is high level and is sufficient to conduct TFT on.

When Stc is low level, SW3 is closed, where the negative input of the amplifier receives positive voltage rise from electrical discharging of Cct. The positive voltage rise that is connected to the negative terminal of the amplifier passes through the amplifier to form an amplified negative voltage drop. The negative voltage drop and the high level of the opening condition of SW3 collectively form VD1$b$ that is high level similar to VD1 of FIG. 5.

Although these solutions may reduce the influence of the delay of the gate voltage caused by discharging voltage of the parasitic capacitor, yet the equivalent parasitic capacitor $C_n$ at the site of the pixel electrode T(n,j) that is distant from the gate bus G is in parallel with the previous (n−1) parasitic capacitors. This may result in different discharging voltages of the parasitic capacitors at the pixel electrodes T(I,j). In other words, for all the thin-film transistors connected to an entire gate line, when the gate voltage is changed from a high level to a low level, the negative voltages resulting from electric discharging of the gate parasitic capacitors of the thin-film transistors is variable. The above solutions of drive circuit cannot well dissolve the issue of extension of conduction time of thin-film transistors.

SUMMARY OF THE INVENTION

An object of the present invention is to provide a drive circuit of liquid crystal panel, which reduces the influence of a parasitic capacitor on the extension of conduction time of a thin-film transistor and improves the quality of a large-sized liquid crystal display device using the circuit.

To achieve the object, the present invention provides a drive circuit of liquid crystal panel, which comprises a gate driver, a source driver, a plurality of gate lines and a plurality of data lines, the plurality of gate lines and the data lines defining a plurality of pixel units. Each of the pixel units comprises a thin-film transistor, a common electrode, a pixel electrode electrically connected to the thin-film transistor, and a storage capacitor. The thin-film transistor is electrically connected to the gate driver and the source driver respectively via the gate line and the data line. The common electrode and the pixel electrode constitute a liquid crystal capacitor. The storage capacitor is connected in parallel to the liquid crystal capacitor. The gate driver comprises a drive combination circuit. The drive combination circuit comprises a first electrical switch, an amplifier electrically connected to the first electrical switch, a first drive source of the amplifier electrically connected to the first electrical switch, a second drive source of the first electrical switch electrically connected to the amplifier, a first resistor electrically connected to two terminals of the amplifier, a third drive source electrically connected to the amplifier, a second resistor electrically connected to the first electrical switch, a second electrical switch electrically connected between the second resistor and the amplifier, a third resistor electrically connected to the amplifier, and a fourth drive source electrically connected to the second electrical switch.

The thin-film transistor comprises a gate terminal, a source terminal, and a drain terminal. The gate terminal is electrically connected via the gate line to the gate driver. The source terminal is electrically connected via the data line to the source driver. The drain terminal is electrically connected to the pixel electrode.

The first electrical switch comprises first, second, and third terminal. The first terminal is electrically connected to the first drive source. The second terminal is electrically connected to the second drive source and the amplifier. The third terminal is electrically connected to an end of the second resistor.

The second electrical switch comprises fourth, fifth, and the sixth terminal. The fourth terminal is electrically connected to an opposite end of the second resistor. The fifth terminal is electrically connected to the fourth drive source. The sixth terminal is electrically connected to the amplifier and an end of the first resistor.

The amplifier comprises seventh, eighth, and ninth terminals. The seventh terminal is electrically connected to the second drive source and the second terminal of the first electrical switch. The eighth terminal is electrically connected to the third drive source and an opposite end of the first resistor. The ninth terminal is electrically connected to the sixth terminal of the second electrical switch, an end of the first resistor, and the third resistor.

The gate terminal of the thin-film transistor is electrically connected to the end of the second resistor that is connected to the first electrical switch.

The first electrical switch is closed when the second terminal is controlled by a high level and is open by a low level. The second electrical switch is closed when the fifth terminal is controlled by a high level and is open by a low level.

The first drive source provides a square wave. The second drive source provides a square wave having the same phase and period as those of the first drive source. The third drive source provides a triangular wave. The fourth drive source provides a square wave of a high frequency.

The present invention also provides a drive circuit of liquid crystal panel, which comprises a gate driver, a source driver, a plurality of gate lines and a plurality of data lines, the plurality of gate lines and the data lines defining a plurality of pixel units, each of the pixel units comprising a thin-film transistor, a common electrode, a pixel electrode electrically connected to the thin-film transistor, and a storage capacitor, the thin-film transistor being electrically connected to the gate driver and the source driver respectively via the gate line and the data line, the common electrode and the pixel electrode constituting a liquid crystal capacitor, the storage capacitor being connected in parallel to the liquid crystal capacitor, the gate driver comprising a drive combination circuit, the drive combination circuit comprising a first electrical switch, an amplifier electrically connected to the first electrical switch, a first drive source of the amplifier electrically connected to the first electrical switch, a second drive source of the first electrical switch electrically connected to the amplifier, a first resistor electrically connected to two terminals of the amplifier, a third drive source electrically connected to the amplifier, a second resistor electrically connected to the first electrical switch, a second electrical switch electrically connected between the second resistor and the amplifier, a third resistor electrically connected to the amplifier, and a fourth drive source electrically connected to the second electrical switch;

wherein the thin-film transistor comprises a gate terminal, a source terminal, and a drain terminal, the gate terminal being electrically connected via the gate line to the gate driver, the source terminal being electrically connected via the data line to the source driver, the drain terminal being electrically connected to the pixel electrode;

wherein the first electrical switch comprises first, second, and third terminal, the first terminal being electrically connected to the first drive source, the second terminal being electrically connected to the second drive source and the amplifier, the third terminal being electrically connected to an end of the second resistor;

wherein the second electrical switch comprises fourth, fifth, and the sixth terminal, the fourth terminal being electrically connected to an opposite end of the second resistor, the fifth terminal being electrically connected to the fourth drive source, the sixth terminal being electrically connected to the amplifier and an end of the first resistor;

wherein the amplifier comprises seventh, eighth, and ninth terminals, the seventh terminal being electrically connected to the second drive source and the second terminal of the first electrical switch, the eighth terminal being electrically connected to the third drive source and an opposite end of the first resistor, the ninth terminal being electrically connected to the sixth terminal of the second electrical switch, an end of the first resistor, and the third resistor;

wherein the gate terminal of the thin-film transistor is electrically connected to the end of the second resistor that is connected to the first electrical switch;

wherein the first electrical switch is closed when the second terminal is controlled by a high level and is open by a low level, the second electrical switch being closed when the fifth terminal is controlled by a high level and is open by a low level; and wherein the first drive source provides a square wave, the second drive source providing a square wave having the same phase and period as those of the first drive source, the third drive source providing a triangular wave, the fourth drive source providing a square wave of a high frequency.

The efficacy of the present invention is that the present invention provides a drive circuit of liquid crystal panel, which, through control effected with electrical switches, combines a drive voltage of square wave with a triangular wave having a predetermined slope to form a drive voltage that shows, at the end of a high level, a falling edge having a falling rate to drive a gate terminal of a thin-film transistor, so as to reduce the extension of conduction time of the thin-film transistor caused by electrical discharging of a parasitic capacitor thereby reducing the chance of abnormal conduction occurring in non-conduction state of the thin-film transistor and thus improving the accuracy of controlling the thin-film transistor to eliminate the variation of transmittance and abnormality of contrast caused by abnormal rotation of liquid crystal molecules and enhance the quality of a large-sized liquid crystal display device using the circuit.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, of the present invention will be apparent from the following detailed description of an embodiment of the present invention, with reference to the attached drawings. In the drawings.

DETAILED DESCRIPTION OF THE PREFERRED EMBODIMENTS

Figure 1:
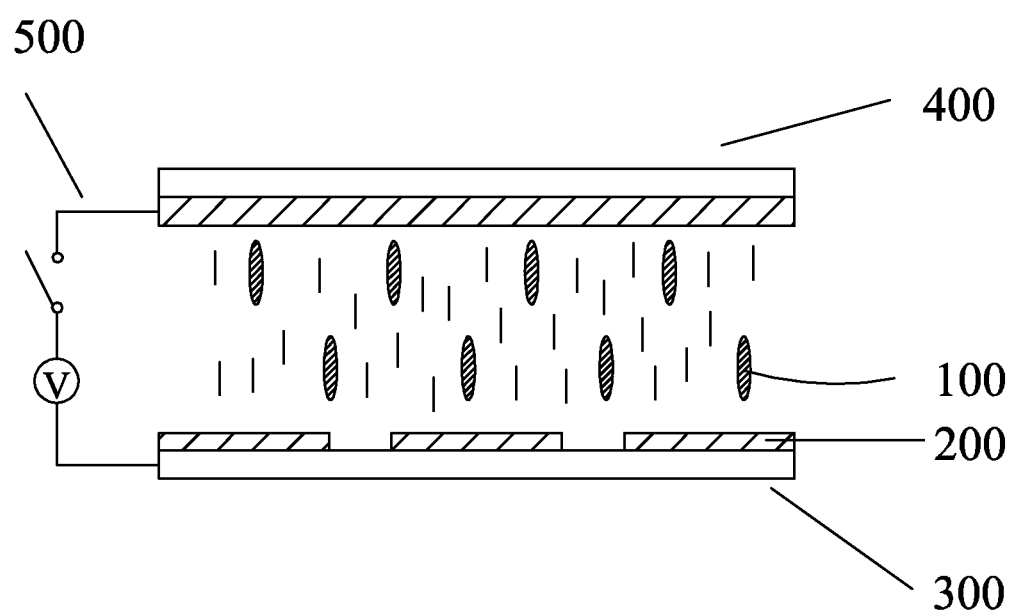
FIG. 1 is a schematic view showing the basic structure of a VA liquid crystal display device.
Figure 2:
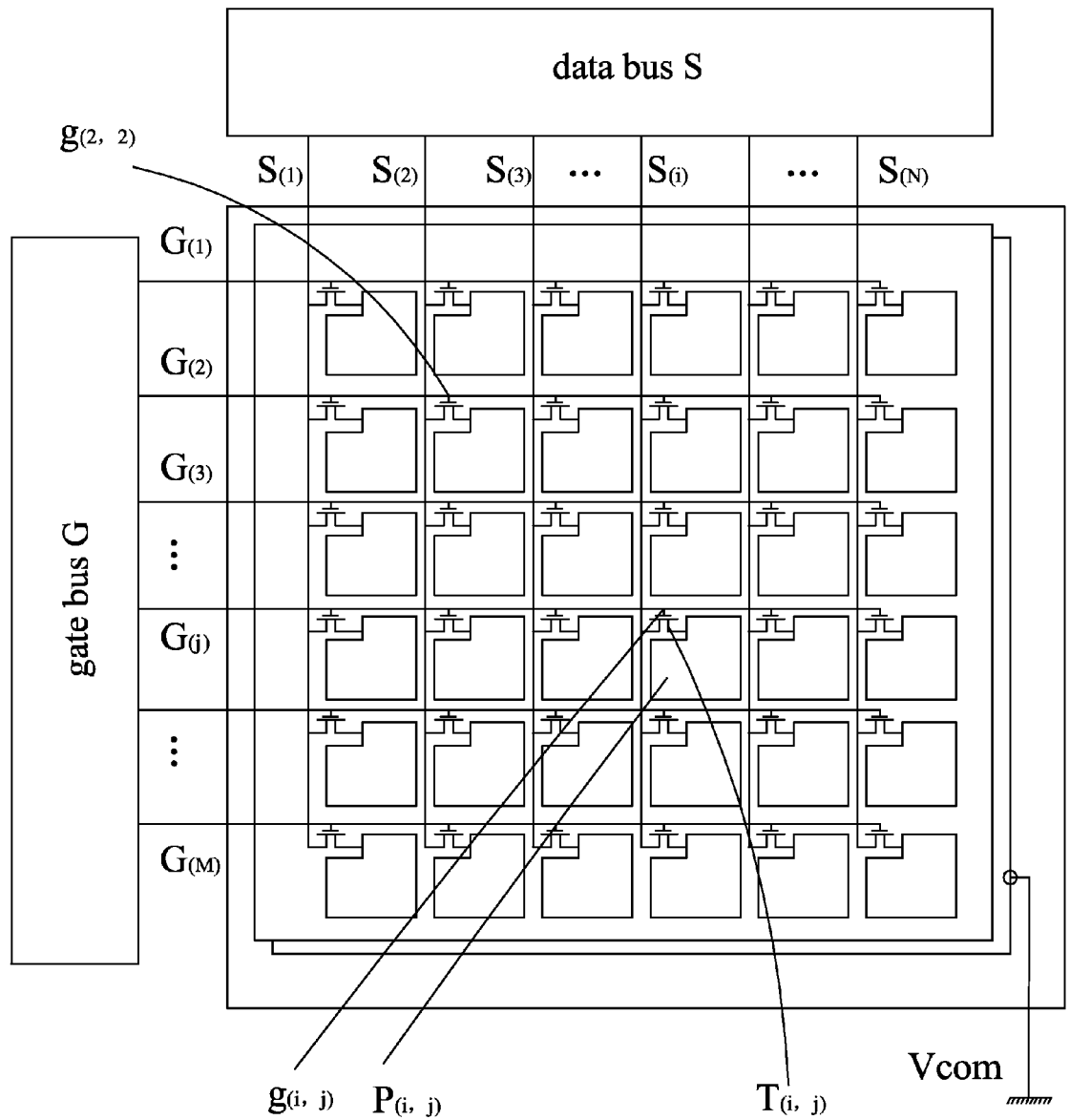
FIG. 2 is a schematic view showing the structure of a drive circuit of TFT array substrate.
Figure 3:
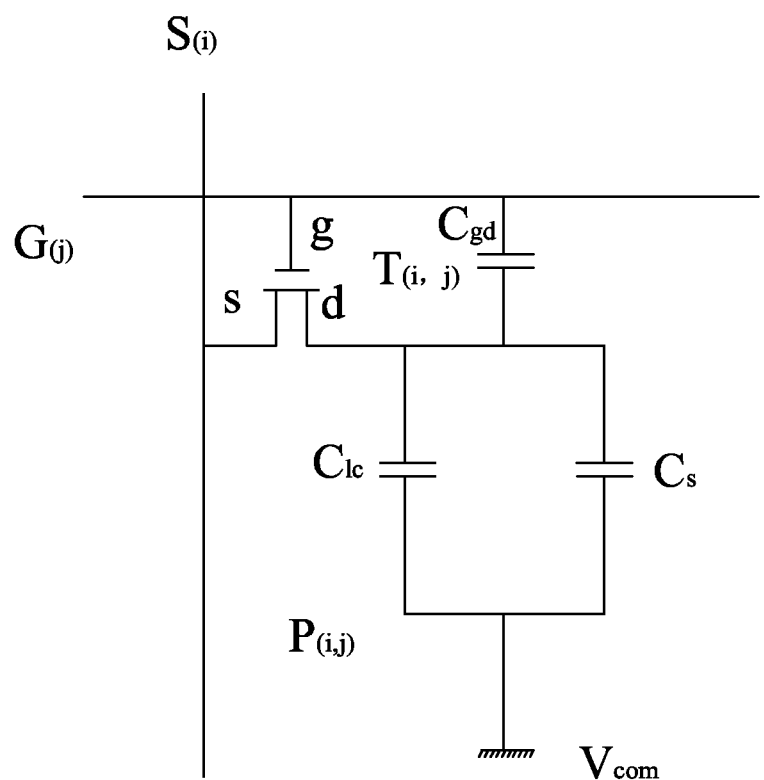
FIG. 3 is a schematic view showing equivalent connection of a drive circuit of a pixel unit.
Figure 4:
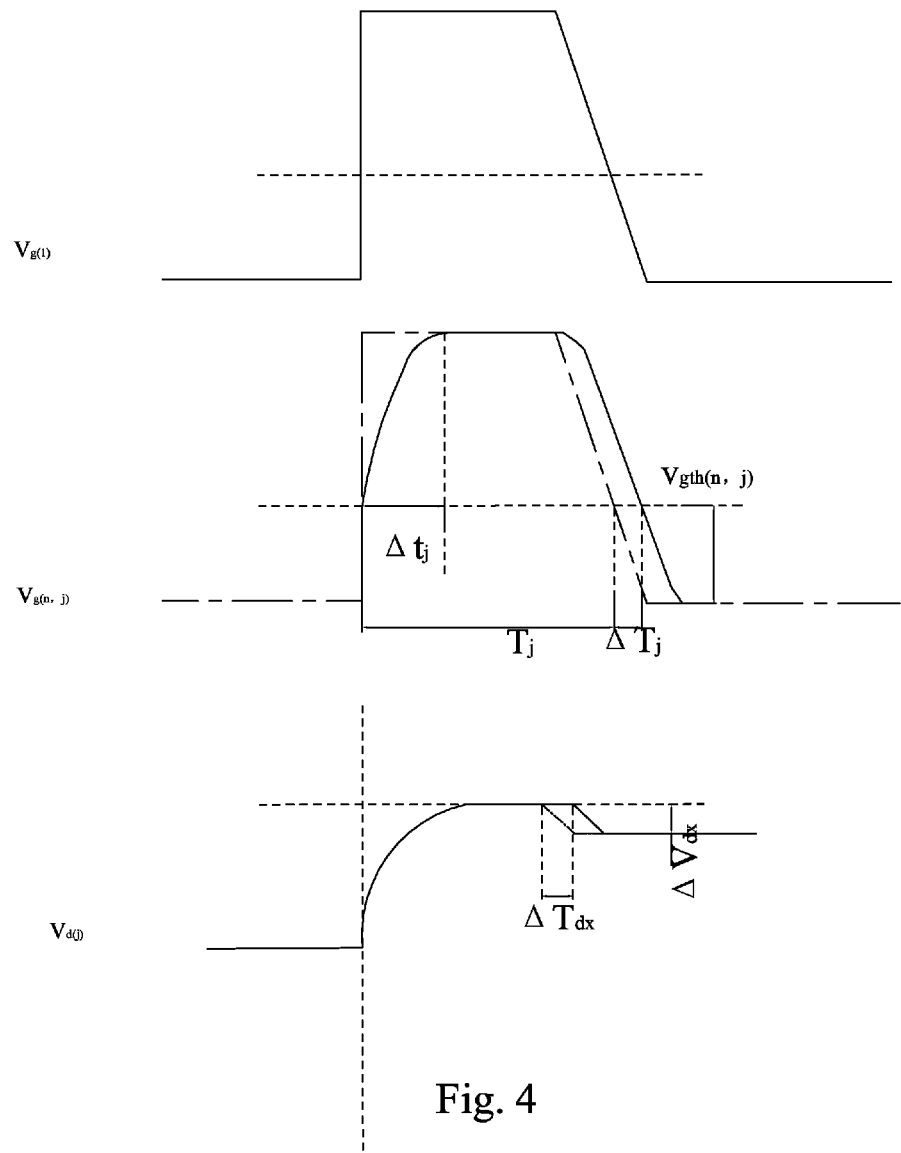
FIG. 4 shows waveform of a gate drive voltage induced by a parasitic capacitor.
Figure 5:
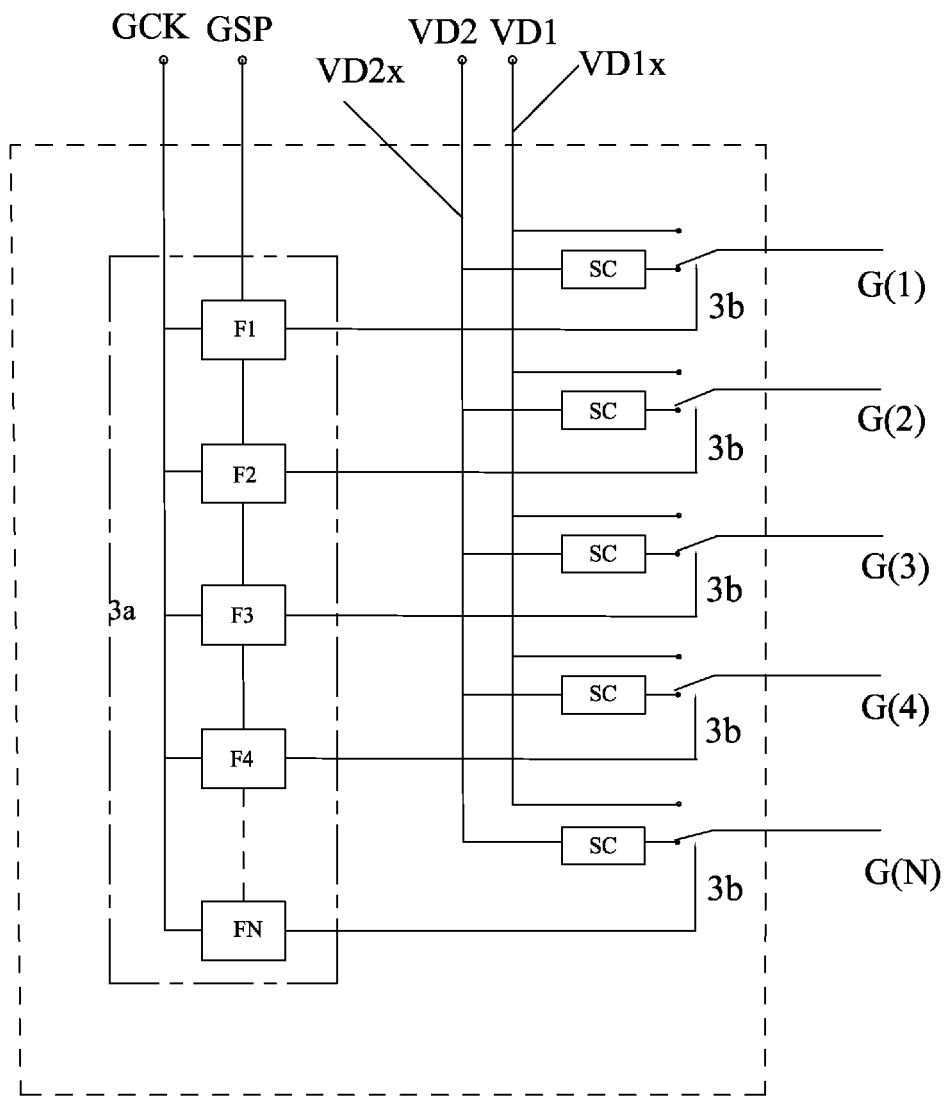
FIG. 5 is a schematic view showing the connection of a conventional drive circuit.
Figure 6A:
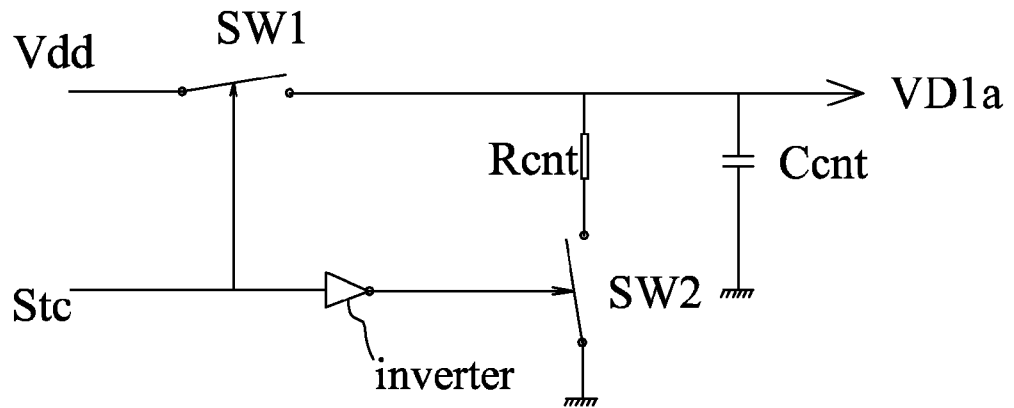
FIGS. 6A and 6B are respectively a schematic view showing the connection of a conventional drive circuit and a waveform induced by such a circuit connection.
Figure 6B:
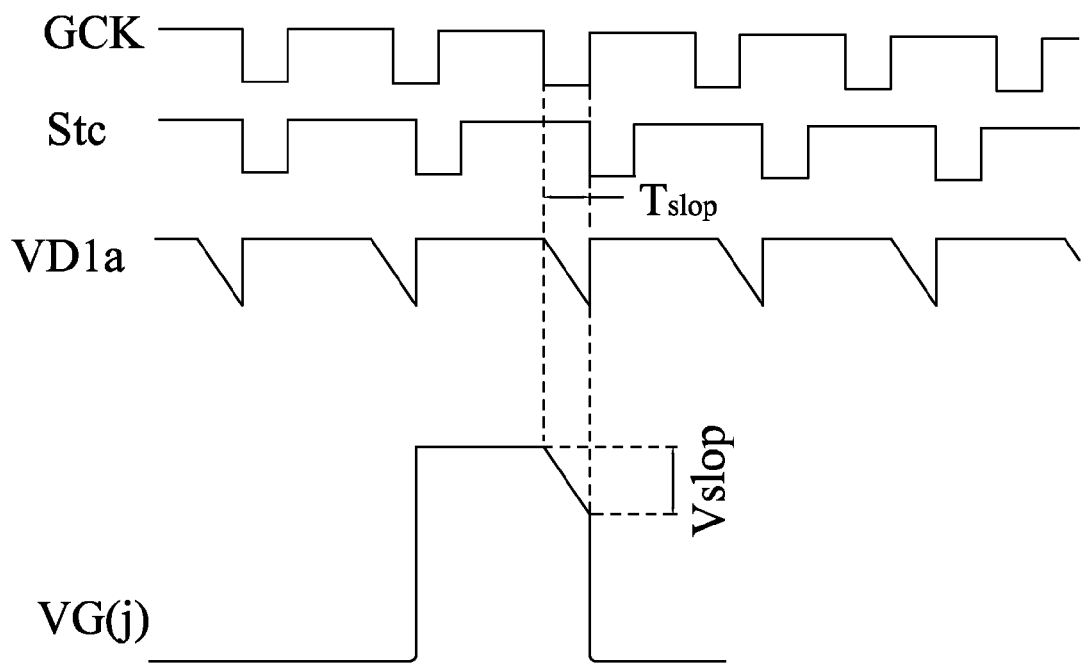
Figure 7A:
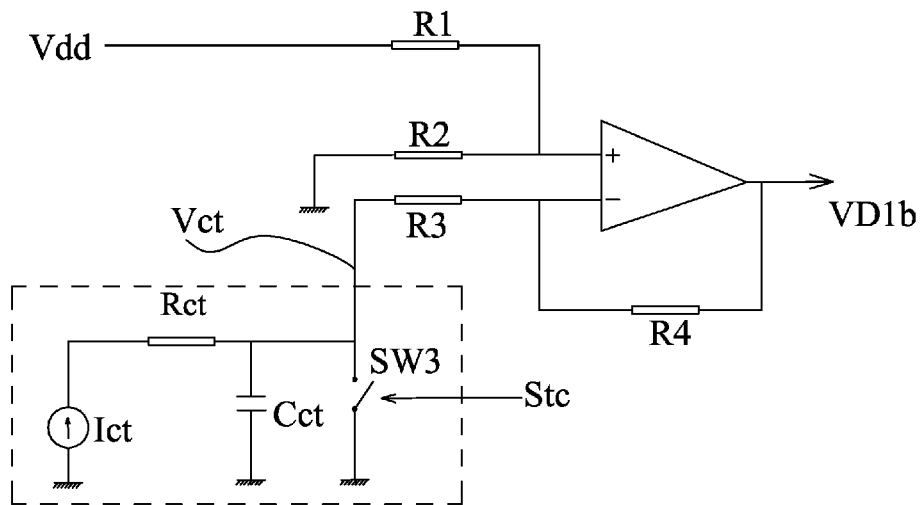
FIGS. 7A and 7B are respectively a schematic view showing the connection of another conventional drive circuit and a waveform induced by such a circuit connection.
Figure 7B:
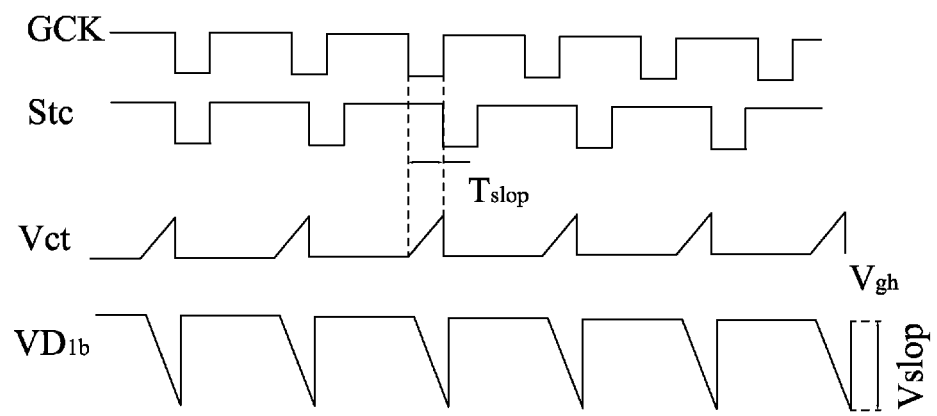
Figure 8:
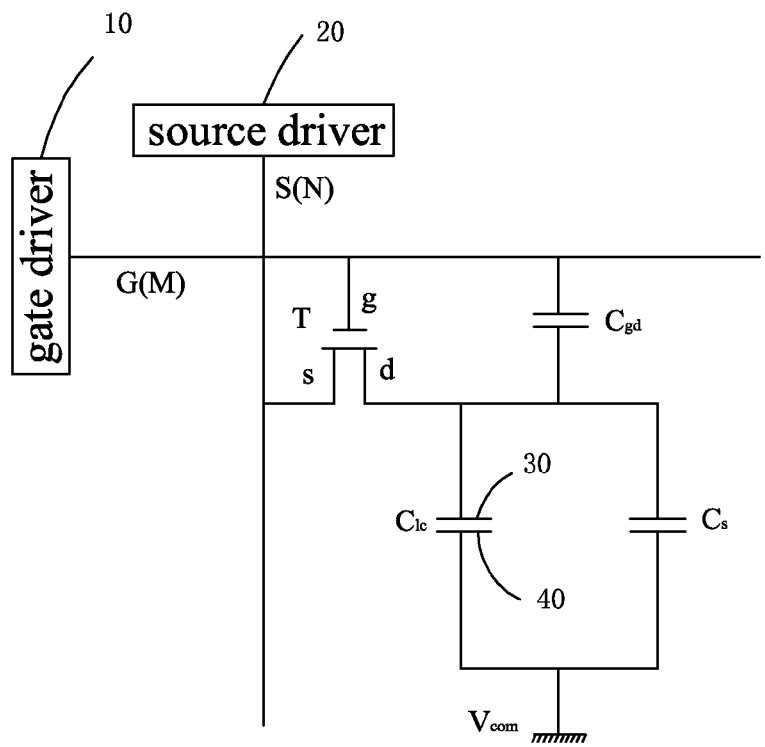
FIG. 8 is a schematic view showing a circuit structure of a pixel unit of a drive circuit of liquid crystal panel according to the present invention.
Figure 9:
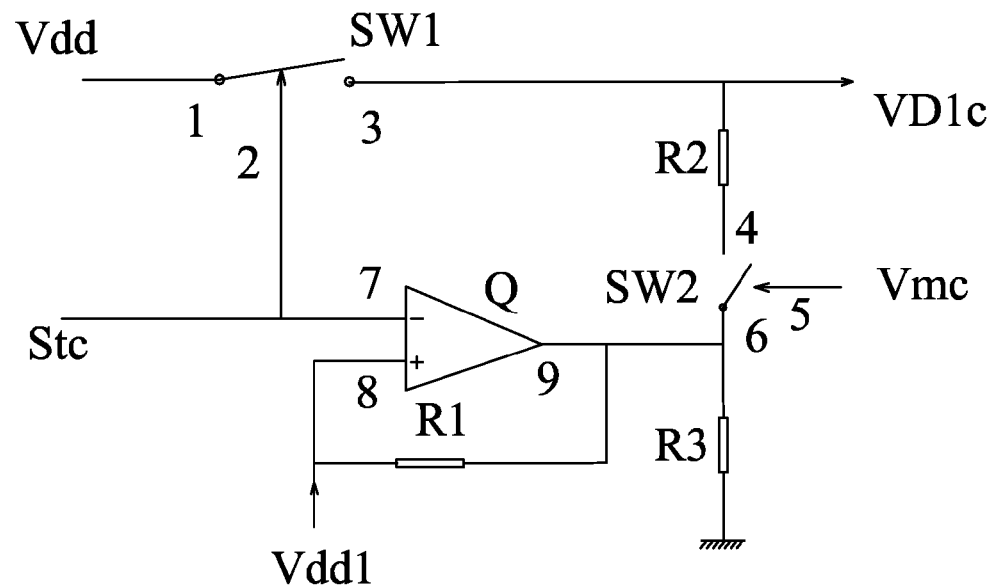
FIG. 9 is a schematic view showing the structure of a drive combination circuit of the drive circuit of liquid crystal panel according to the present invention.

To further expound the technical solution adopted in the present invention and the advantages thereof, a detailed description is given to a preferred embodiment of the present invention and the attached drawings.

Referring to FIGS. 5 and 8-12, the present invention provides a drive circuit of liquid crystal panel, which comprises a gate driver 10, a source driver 20, a plurality of gate lines G(M), and a plurality of data lines S(N). The plurality of gate lines G(M) and data lines S(N) define a plurality of pixel units. Each of the pixel units comprises a thin-film transistor T, a common electrode 40, a pixel electrode 30 electrically connected to the thin-film transistor T, and a storage capacitor $C_s$. The thin-film transistor T is electrically connected to the gate driver 10 and the source driver 20 respectively via the gate line G(M) and the data line S(N). The common electrode 40 and the pixel electrode 30 constitute a liquid crystal capacitor $C_{lc}$. The storage capacitor $C_s$ is connected in parallel to the liquid crystal capacitor $C_{lc}$.

The plurality of gate lines G(1), G(2), ..., and G(M) constitutes a gate bus structure G. The plurality of data lines S(1), S(2), ..., and S(N) constitutes a data bus structure S.

The gate driver 10 comprises a drive combination circuit. The drive combination circuit comprises a first electrical switch SW1, an amplifier Q electrically connected to the first electrical switch SW1, a first drive source Vdd, a second drive source Stc, a first resistor R1 electrically connected to two terminals of the amplifier Q, a third drive source Vdd1 electrically connected to amplifier Q, a second resistors R2 electrically connected to the first electrical switch SW1, a second electrical switch SW2 electrically connected to between the second resistors R2 and the 0.91, a third resistor R3 electrically connected to amplifier Q, and a fourth drive source Vmc electrically connected to the second electrical switch SW2. The first, second, third, and four drive sources Vdd, Stc, Vdd1, and Vmc can be provided from a power supply and corresponding circuits.

In the instant preferred embodiment, the thin-film transistor T comprises a gate terminal g, a source terminal s, and a drain terminal d. The gate terminal g is electrically connected via the gate line G(M) to the gate driver 10. The source terminal s is electrically connected via the data line S(N) to the source driver 20. The drain terminal d is electrically connected to the pixel electrode 30. Due to structural characteristics, the gate terminal g and the drain terminal d form a parasitic capacitor $C_{gd}$. The gate driver 10 applies a drive voltage that has a falling edge $V'_{slop}$ having a falling slope at the end of a high level to the gate terminal g of the thin-film transistor T so as to eliminate the influence of the parasitic capacitor $C_{gd}$ on the conduction time of the gate terminal g. The voltage within the falling duration of the falling edge $V'_{slop}$ can partly or entirely compensate a discharging voltage applied to the gate terminal g by the parasitic capacitor $C_{gd}$, thereby shortening the time extension of the gate terminal g and ensuring that the thin-film transistor TFT can be precisely conducted on or cut off.

The first electrical switch SW1 comprises first, second, and third terminal 1, 2, 3. The first terminal 1 is electrically connected to the first drive source $V_{dd}$. The second terminal 2 is electrically connected to the second drive source Stc and the amplifier Q. The third terminal 3 is electrically connected to an end of the second resistor R2. The second electrical switch SW2 comprises fourth, fifth, and the sixth terminal 4, 5, 6. The fourth terminal 4 is electrically connected to an opposite end of the second resistor R2. The fifth terminal 5 is electrically connected to the fourth drive source Vmc. The sixth terminal 6 is electrically connected to the amplifier Q and an end of the first resistor R1. The first electrical switch SW1 is closed when the second terminal 2 is controlled by a high level and is open by a low level. The second electrical switch SW2 is closed when the fifth terminal 5 is controlled by a high level and is open by a low level. In this way, the second and the fourth drive sources Stc, Vmc are respectively applied to control the first and second electrical switches W1, SW2 to close or open, thereby effecting combination of the first drive source Vdd and the third drive source Vdd1.

The amplifier Q comprises seventh, eighth, and ninth terminals 7, 8, 9. The seventh terminal 7 is electrically connected to the second drive source Stc and the second terminal 2 of the first electrical switch SW1. The eighth terminal 8 is electrically connected to the third drive source Stc and an opposite end of the first resistor R1. The ninth terminal 9 is electrically connected to the sixth terminal 6 of the second electrical switch SW2, an end of the first resistor R1, and the third resistor R3. An opposite end of the third resistor R3 is grounded. The gate terminal g of the thin-film transistor T is electrically connected to the end of the second resistor R2 that is connected to the first electrical switch SW1.

The first drive source $V_{dd}$ provides a square wave. The second drive source Stc provides a square wave having the same phase and period as those of the first drive source $V_{dd}$. The third drive source $V_{dd1}$ provides a triangular wave. The fourth drive source $V_{mc}$ provides a square wave of a high frequency. The fourth drive source $V_{mc}$ can be a control clock signal.

In the instant preferred embodiment, the drive voltage V applied to the gate terminal g of the thin-film transistor T comprises a drive voltage V of the gate line G(M) that is generated by a high level (VD1) generation circuit $VD1_x$ and a low level (VD2) generation circuit $VD2_x$. The high level generation circuit $VD1_x$ generates, at the end of high level, a voltage falling edge $V'_{slop}$. The voltage falling edge $V'_{slop}$ has negative linear voltage drop or negative stepped voltage drop.

Figure 10:
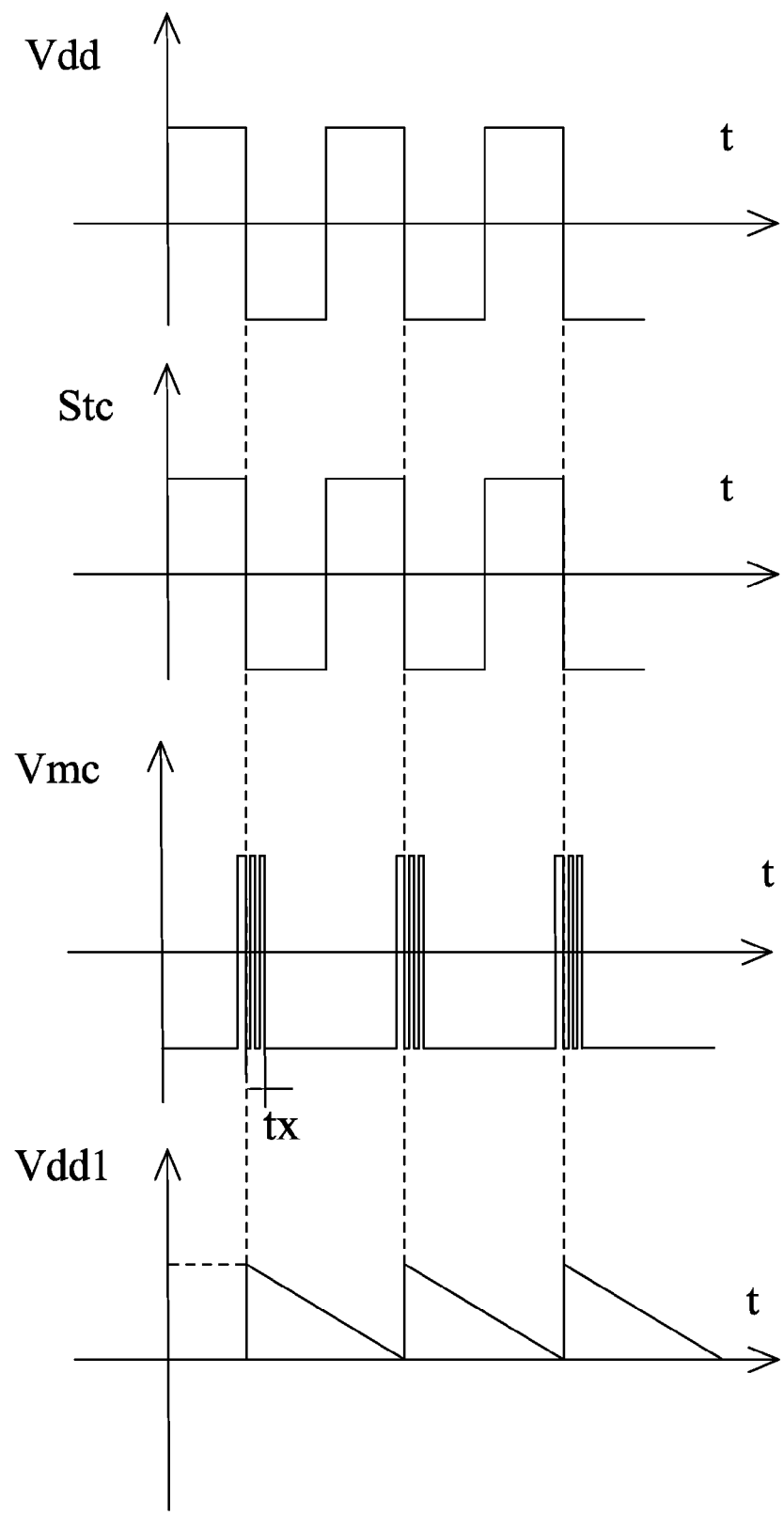
FIG. 10 shows waveforms of first, second, third, and four drive sources of the drive circuit of liquid crystal panel according to the present invention.
Figure 11:
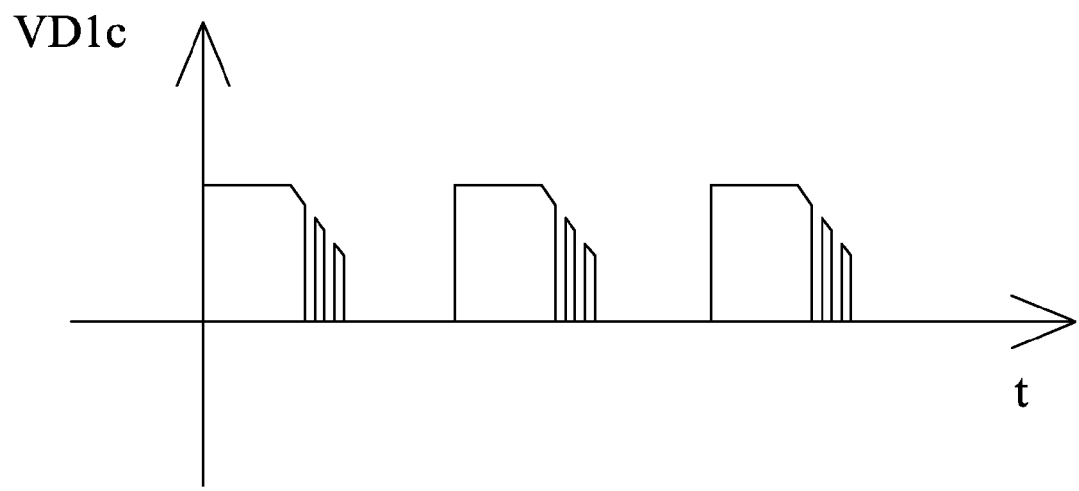
FIG. 11 shows waveform of an output terminal VD1c of the drive circuit of liquid crystal panel according to the present invention.
Figure 12:
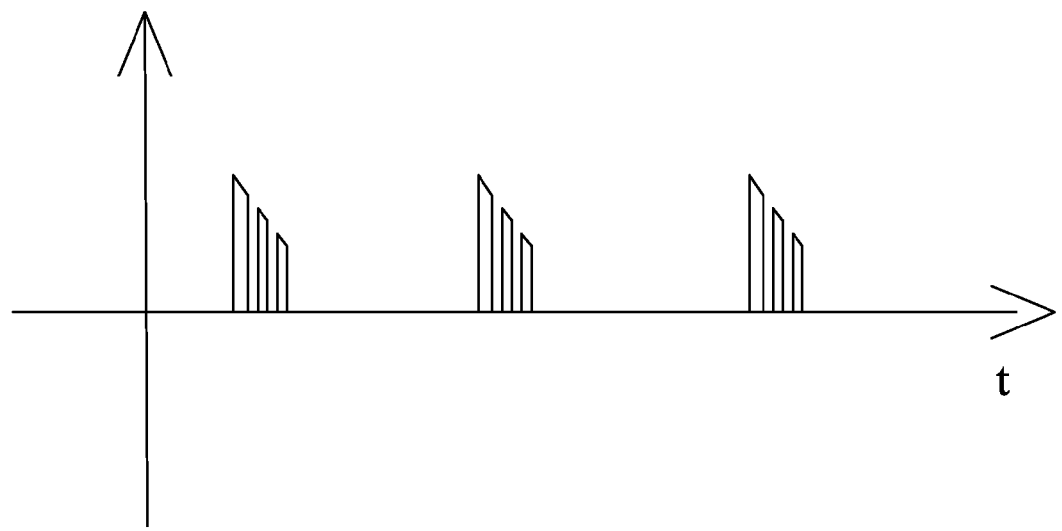
FIG. 12 shows waveform of falling edge V'$_{slop}$ of the drive circuit of liquid crystal panel according to the present invention.

Referring to FIGS. 10-12, waveforms of the first drive source $V_{dd}$, the second drive source $S_{tc}$, the third drive source $V_{dd1}$, the fourth drive source $V_{mc}$, and the output terminal VD1c and the falling edge $V'_{slop}$ are shown in the drawings. $S_{tc}$ and $V_{mc}$ are both clock signals with CLK modified. The amplitude of the first drive source $V_{dd}$ is identical to the amplitude of the voltage signal on the gate line G(j). When the second drive source $S_{tc}$ is high level, the first drive source $V_{dd}$ is high level and the first electrical switch SW1 is closed and the second electrical switch SW2 is open. Under this condition, the output terminal VD1c is of high level VD1. When the second drive source $S_{tc}$ is low level, the first drive source $V_{dd}$ is low level and the first electrical switch SW1 is open and the second electrical switch SW2 is controlled by the variation of the fourth drive source $V_{mc}$ to open or close. Meanwhile, the voltage signal of the first drive source $V_{dd1}$ that shows a linear dropping waveform is connected via the amplifier to the second electrical switch SW2, so that signal of the first drive source $V_{dd1}$ is fed through the amplifier Q and applied, under the control of the second electrical switch SW2, to the output terminal VD1c. A combined signal of the output terminal VD1c and the low level VD2 is used to drive the gate line G(j). The generation of the falling edge $V'_{slop}$ is controlled by the fourth drive source $V_{mc}$. The fourth drive source $V_{mc}$ is of low level when the second drive source $S_{tc}$ is high level and shows a high frequency f in the time interval $t_x$ when the second drive source $S_{tc}$ changes from a high level to a low level. In the time interval, the second electrical switch SW2 is closed and open in a high speed, which, together with sampling applied the third drive source $V_{dd1}$, forms the waveform of the falling edge $V'_{slop}$ as shown in FIG. 11. The waveform of the falling edge $V'_{slop}$ may be changed according to the duration of $t_x$ and various parameters of the frequency f within the duration to obtain different waveforms for the falling edge $V'_{slop}$.

The waveform of the falling edge V'$_{slop}$ and the high level when first electrical switch SW1 is closed and the second electrical switch SW2 is open together form the high level VD1$c$ of the gate line G(j).

In summary, the present invention provides a drive circuit of liquid crystal panel, which, through control effected with electrical switches, combines a drive voltage of square wave with a triangular wave having a predetermined slope to form a drive voltage that shows, at the end of a high level, a falling edge having a falling rate to drive a gate terminal of a thin-film transistor, so as to reduce the extension of conduction time of the thin-film transistor caused by electrical discharging of a parasitic capacitor thereby reducing the chance of abnormal conduction occurring in non-conduction state of the thin-film transistor and thus improving the accuracy of controlling the thin-film transistor to eliminate the variation of transmittance and abnormality of contrast caused by abnormal rotation of liquid crystal molecules and enhance the quality of a large-sized liquid crystal display device using the circuit.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A drive circuit of liquid crystal panel, comprising a gate driver, a source driver, a plurality of gate lines and a plurality of data lines, the plurality of gate lines and the data lines defining a plurality of pixel units, each of the pixel units comprising a thin-film transistor, a common electrode, a pixel electrode electrically connected to the thin-film transistor, and a storage capacitor, the thin-film transistor being electrically connected to the gate driver and the source driver respectively via the gate line and the data line, the common electrode and the pixel electrode constituting a liquid crystal capacitor, the storage capacitor being connected in parallel to the liquid crystal capacitor, the gate driver comprising a drive combination circuit, the drive combination circuit comprising a first electrical switch, an amplifier electrically connected to the first electrical switch, a first drive source of the amplifier electrically connected to the first electrical switch, a second drive source of the first electrical switch electrically connected to the amplifier, a first resistor electrically connected to two terminals of the amplifier, a third drive source electrically connected to the amplifier, a second resistor electrically connected to the first electrical switch, a second electrical switch electrically connected between the second resistor and the amplifier, a third resistor electrically connected to the amplifier, and a fourth drive source electrically connected to the second electrical switch.

2. The drive circuit of liquid crystal panel as claimed in claim 1, wherein the thin-film transistor comprises a gate terminal, a source terminal, and a drain terminal, the gate terminal being electrically connected via the gate line to the gate driver, the source terminal being electrically connected via the data line to the source driver, the drain terminal being electrically connected to the pixel electrode.

3. The drive circuit of liquid crystal panel as claimed in claim 2, wherein the first electrical switch comprises first, second, and third terminal, the first terminal being electrically connected to the first drive source, the second terminal being electrically connected to the second drive source and the amplifier, the third terminal being electrically connected to an end of the second resistor.

4. The drive circuit of liquid crystal panel as claimed in claim 3, wherein the second electrical switch comprises fourth, fifth, and the sixth terminal, the fourth terminal being electrically connected to an opposite end of the second resistor, the fifth terminal being electrically connected to the fourth drive source, the sixth terminal being electrically connected to the amplifier and an end of the first resistor.

5. The drive circuit of liquid crystal panel as claimed in claim 4, wherein the amplifier comprises seventh, eighth, and ninth terminals, the seventh terminal being electrically connected to the second drive source and the second terminal of the first electrical switch, the eighth terminal being electrically connected to the third drive source and an opposite end of the first resistor, the ninth terminal being electrically connected to the sixth terminal of the second electrical switch, an end of the first resistor, and the third resistor.

6. The drive circuit of liquid crystal panel as claimed in claim 5, wherein the gate terminal of the thin-film transistor is electrically connected to the end of the second resistor that is connected to the first electrical switch.

7. The drive circuit of liquid crystal panel as claimed in claim 6, wherein the first electrical switch is closed when the second terminal is controlled by a high level and is open by a low level, the second electrical switch being closed when the fifth terminal is controlled by a high level and is open by a low level.

8. The drive circuit of liquid crystal panel as claimed in claim 1, wherein the first drive source provides a square wave, the second drive source providing a square wave having the same phase and period as those of the first drive source, the third drive source providing a triangular wave, the fourth drive source providing a square wave of a high frequency.

9. A drive circuit of liquid crystal panel, comprising a gate driver, a source driver, a plurality of gate lines and a plurality of data lines, the plurality of gate lines and the data lines defining a plurality of pixel units, each of the pixel units comprising a thin-film transistor, a common electrode, a pixel electrode electrically connected to the thin-film transistor, and a storage capacitor, the thin-film transistor being electrically connected to the gate driver and the source driver respectively via the gate line and the data line, the common electrode and the pixel electrode constituting a liquid crystal capacitor, the storage capacitor being connected in parallel to the liquid crystal capacitor, the gate driver comprising a drive combination circuit, the drive combination circuit comprising a first electrical switch, an amplifier electrically connected to the first electrical switch, a first drive source of the amplifier electrically connected to the first electrical switch, a second drive source of the first electrical switch electrically connected to the amplifier, a first resistor electrically connected to two terminals of the amplifier, a third drive source electrically connected to the amplifier, a second resistor electrically connected to the first electrical switch, a second electrical switch electrically connected between the second resistor and the amplifier, a third resistor electrically connected to the amplifier, and a fourth drive source electrically connected to the second electrical switch;

wherein the thin-film transistor comprises a gate terminal, a source terminal, and a drain terminal, the gate terminal being electrically connected via the gate line to the gate driver, the source terminal being electrically connected via the data line to the source driver, the drain terminal being electrically connected to the pixel electrode;

wherein the first electrical switch comprises first, second, and third terminal, the first terminal being electrically connected to the first drive source, the second terminal being electrically connected to the second drive source and the amplifier, the third terminal being electrically connected to an end of the second resistor;

wherein the second electrical switch comprises fourth, fifth, and the sixth terminal, the fourth terminal being electrically connected to an opposite end of the second resistor, the fifth terminal being electrically connected to the fourth drive source, the sixth terminal being electrically connected to the amplifier and an end of the first resistor;

wherein the amplifier comprises seventh, eighth, and ninth terminals, the seventh terminal being electrically connected to the second drive source and the second terminal of the first electrical switch, the eighth terminal being electrically connected to the third drive source and an opposite end of the first resistor, the ninth terminal being electrically connected to the sixth terminal of the second electrical switch, an end of the first resistor, and the third resistor;

wherein the gate terminal of the thin-film transistor is electrically connected to the end of the second resistor that is connected to the first electrical switch;

wherein the first electrical switch is closed when the second terminal is controlled by a high level and is open by a low level, the second electrical switch being closed when the fifth terminal is controlled by a high level and is open by a low level; and wherein the first drive source provides a square wave, the second drive source providing a square wave having the same phase and period as those of the first drive source, the third drive source providing a triangular wave, the fourth drive source providing a square wave of a high frequency.

* * * * *